April 11, 1967  E. LAUBER  3,313,243
MONORAIL SWITCH
Filed Sept. 4, 1964
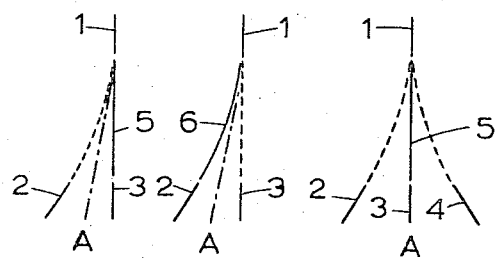
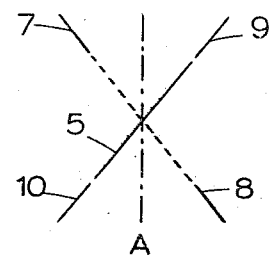
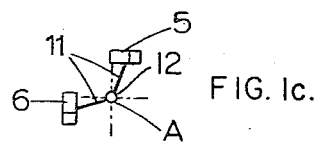
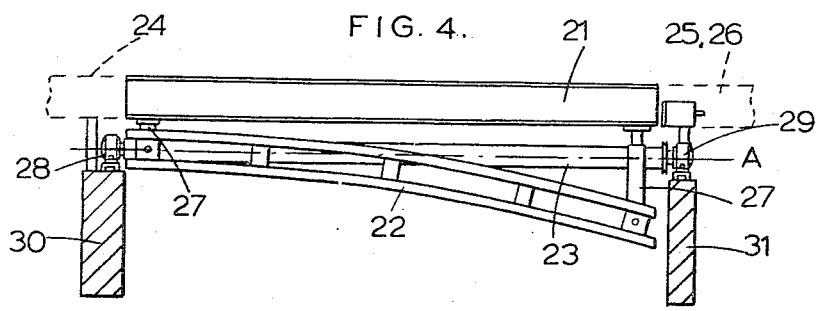
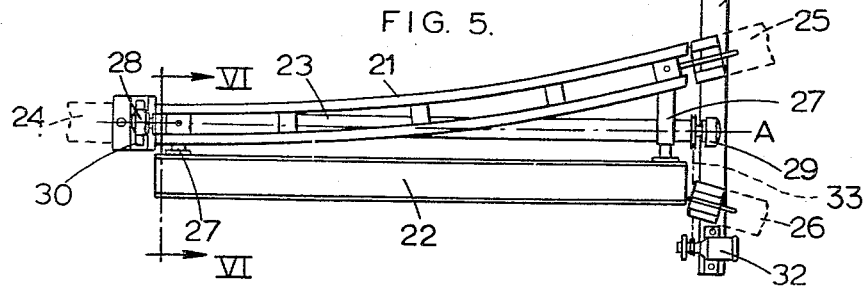
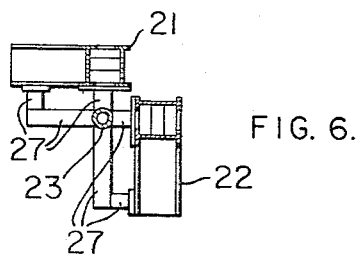
INVENTOR
Ernst Lauber
BY Shoemaker and Mattare
ATTORNEYS

United States Patent Office 3,313,243
Patented Apr. 11, 1967

3,313,243
MONORAIL SWITCH
Ernst Lauber, Thun, Switzerland, assignor to Maschinenfabrik Habegger, Thun, Switzerland
Filed Sept. 4, 1964, Ser. No. 394,576
Claims priority, application Switzerland, Mar. 20, 1964, 3,690/64
2 Claims. (Cl. 104—101)

The present invention relates to a new and novel switch for railways, and more particularly to a switch which is adapted for use with suspension rails and monorails or the like.

The vehicles employed with suspension rails and monorails or the like include a support portion resting on the rail, this support portion surrounding the rail on three sides thereof in the manner of a saddle, these three sides comprising the upper surface of the rail and the two side surfaces thereof. With arrangement of the prior art wherein the axes of rotation of rail portions are disposed adjacent the track to one side thereof, the axes must of necessity be spaced at some distance laterally from the rail and the yokes carrying the rail portions are large and suitably curved to allow for passage of the vehicle. The space occupied by the switch means is accordingly considerable and the parts projecting above the upper surface of the rail constitute a dangerous hazard. The amount of space required and the number of structural parts are considerable with such arrangements which further can accommodate only two switching positions. Additionally, the provision of current carrying rails is difficult, if not impossible.

As contrasted with the arrangements of the prior art, the present invention incorporates a unique arrangement wherein the switch is rotatable about an axis which has a particular relationship with respect to the fixed tracks with which it is associated, the switch being employed for establishing a rail connection between at least one trunk rail and at least two branch rails. The trunk rail and the branch rails are disposed in fixed spaced relationship to one another, and the switch includes a plurality of switch rails adapted to make the desired connections, these switch rails being mounted upon a suitable support means which is adapted to rotate about an axis of rotation in such a manner that no space is occupied at the side of the vehicle outside the clearance profile of the vehicle, and no danger of accidents when used for small pleasure monorails exists since the support means and drive means therefor is disposed beneath the fixed rails. With this arrangement, a simple drive means may be employed and optimum possibilities of protection against icing are afforded. Additionally, more than two switching positions are readily obtainable.

An object of the present invention is to provide a new and novel switch for suspension rails and monorails or the like wherein no space is taken up at the side of the vehicle outside the clearance profile of the vehicle and further wherein danger from accidents is minimized.

A further object of the invention is the provision of a switch for suspension rails and monorails or the like wherein a simple drive means is employed and optimum protection against icing is afforded and further wherein more than two switching positions are possible.

Other objects and many attendant advantages of the invention will become more apparent when considered in connection with the specification and accompanying drawings, wherein:

FIG. 1a is a diagrammatic view showing the manner in which the switch according to the present invention may be employed in a single rail tracks system and illustrating the switch in one operative position;

FIG. 1b is a view similar to FIG. 1a showing the switch in a different operative position;

FIG. 1c is an end view of the structure illustrated schematically in FIG. 1a;

FIG. 2 is a diagrammatic view similar to FIG. 1a and showing a modified switching arrangement;

FIG. 3 is a view similar to FIG. 2 illustrating a still further modified form of the invention;

FIG. 4 is a side elevation of a switch according to the invention for an arrangement employing a trunk rail and two branch rails; and FIG. 5 is a plan view of the structure shown in FIG. 4 with the switch in one operative position;

FIG. 6 is a cross sectional view on the line VI—VI of FIG. 5.

Referring now particularly to FIGS. 1a, 1b and 1c, 1 represents a trunk rail while 2 and 3 represent branch rails. The switch means includes two switch rails or sections 5 and 6, these switch rails being mounted on a suitable support means by support members 11, the support means in its entirety being mounted for rotation about an axis A so that either the straight portion of switch rail 5 can be moved into the position shown in solid lines in FIG. 1a to form a connection between the rails 1 and 3, or the other curved switch rail 6 may be moved into the position shown in FIG. 1b to form a connection between rails 1 and 2. The support means may comprise a tubular member which is disposed concentrically with the axis A, this tubular member being identified by reference numeral 12 in FIG. 1c.

Referring now to FIG. 2, the fixed trunk rail is again indicated by reference numeral 1, and branch rails are indicated by reference numerals 2 and 3 similar to the branch rails previously described. In FIG. 2, an additional branch rail 4 is illustrated. In this form of the invention, the switch rail 5 is illustrated as providing a connection between trunk rail 1 and branch rail 3. A pair of switch rails similar to the curved switch rail 6 previously described are operatively connected with the switch rail 5 so that the curved switch rail portions may be moved into the dotted line positions illustrated in FIG. 2 for providing the necessary connection between rails 1 and 2 or between rails 1 and 4 as desired, the switch rails all being mounted about an axis of rotation A which is aligned with the rail portions 1 and 3.

Referring to FIG. 3, a crossroad switch arrangement is illustrated. The support means of the switch is mounted for rotation about the axis A, this support means having a pair of straight switch rails mounted thereon. As illustrated in solid lines, a straight rail portion 5 is in position to establish a connection between the fixed rails 9 and 10. A further straight portion switch rail may be brought into the dotted line position to connect the fixed rails 7 and 8. If the cross section of the vehicle and the angle of the fork of the switch are suitably chosen, it is possible to mount not only the straight portions of rail but also curved portions of rail on the support means which rotates about the axis of rotation A so that it may further be possible to connect rail 7 with rail 10 and rail 9 with rail 8.

In each instance, the axis of rotation of the support means upon which the switch rails are carried is in a particular orientation with respect to the fixed wall portions. Considering the plan view of the various arrangements, it will be noted that in each case, the fixed rails define at least three spaced points at the outer ends thereof. If these three spaced points at the outer ends of the fixed rails are joined so that straight lines extend between the adjacent points, a plane figure will be defined. It is apparent that in FIGS. 1a, 1b and Fig. 2, a triangle will be formed by so joining these end points. In FIG. 3, a rectangle will be defined by so joining these points. In each case, the axis of rotation of the support means of the switch is disposed within the plane figure so defined. Additionally, this axis of rotation is parallel with and below the plane defined by the fixed rails. Additionally, the axis of rotation lies substantially in the plane of symmetry of the so-formed plane figure as seen in plan view. In each form of the invention, the axis of rotation will be so oriented in order to provide the new and improved results.

Referring now to FIGS. 4, 5 and 6, a trunk rail is indicated by reference numeral 24 and a pair of branch rails are indicated by reference numerals 25 and 26. The switch means includes two curved switch rails 21 and 22 which are mounted upon a support means rotatable about an axis A. A tubular support member 23 is disposed concentrically about axis A, the switch rails 21 and 22 being interconnected with tubular member 23 by support members 27 which serve to rigidly interconnect the tubular member with these switch rails.

The opposite end portions of tubular member 23 are rotatably supported within bearings 28 and 29 which are anchored in piers 30 and 31 respectively. The pier 30 also carries the supporting means for the trunk rail 34, while the pier 31 also carries the supporting means for the branch rails 25 and 26 and an actuating motor 32. This actuating motor 32 is drivingly interconnected with tubular member 23 by a belt or chain drive 33 for rotating tubular member 23 to properly position either of the switch rails 21 or 22 in line with the trunk rail 24 and one of the other of the two branch rails 25 and 26 as the case may be. The components employed for locking the branch rails in position are of a known type, and manually actuated or electromechanically operated connecting pins may be provided for this purpose.

Precautions must of course be taken to prevent the associated vehicle from being derailed during rotation of the support means about axis A. In electrically operated railways, it is desirable for lengths of rail at a suitable distance from the switch to be de-energized as soon as the switch lock is released. In manually operated installations, the portions of rail adjacent the switch are provided with automatically mechanically operated adjustable buffers which will serve to stop a vehicle before entering an open switch.

I claim:
1. A switch for suspension rails and monorails, said switch being designed to establish connections between at least one fixed trunk rail and at least two spaced and fixed branch rails, said trunk rail and said branch rails being positioned so that when considered in plan view, and with the end portions of the rails connected by straight lines, a horizontal plane figure is defined, the corners of such plane figure lying at the ends of the fixed rails, said switch including at least two separate switch rails adapted to establish said connections, said switch including support means upon which said switch rails are mounted, said support means comprising a tubular member rotatable about an axis which is beneath said horizontal plane of said fixed rails and which in plan view is disposed within said plane figure, said tubular member being supported at its ends in bearings and having radially extending arms which support said switch rails, and means for rotating said tubular member and rails mounted thereon for moving said switch rails into operative position to establish a desired connection.

2. A switch as defined in claim 1, wherein each of said switch rails curve outwardly away from said tubular member and from the end adjacent the fixed trunk rail.

References Cited by the Examiner

UNITED STATES PATENTS

| | | | |
|---|---|---|---|
| 582,436 | 5/1897 | Ridgway | 104—99 |
| 631,687 | 8/1899 | Whaley | 104—101 |
| 836,042 | 11/1906 | Johnston | 104—99 |
| 1,201,080 | 10/1916 | Nikonow | 104—101 |
| 1,253,800 | 1/1918 | English | 104—130 |
| 1,684,986 | 9/1928 | Gillies | 104—99 |
| 2,511,027 | 6/1950 | Werner | 104—101 |
| 2,535,541 | 12/1950 | Le Fiell | 104—101 |

ARTHUR L. LA POINT, *Primary Examiner.*

F. W. MONAGHAN, H. BELTRAN,
*Assistant Examiners.*